United States Patent Office 3,051,528
Patented Aug. 28, 1962

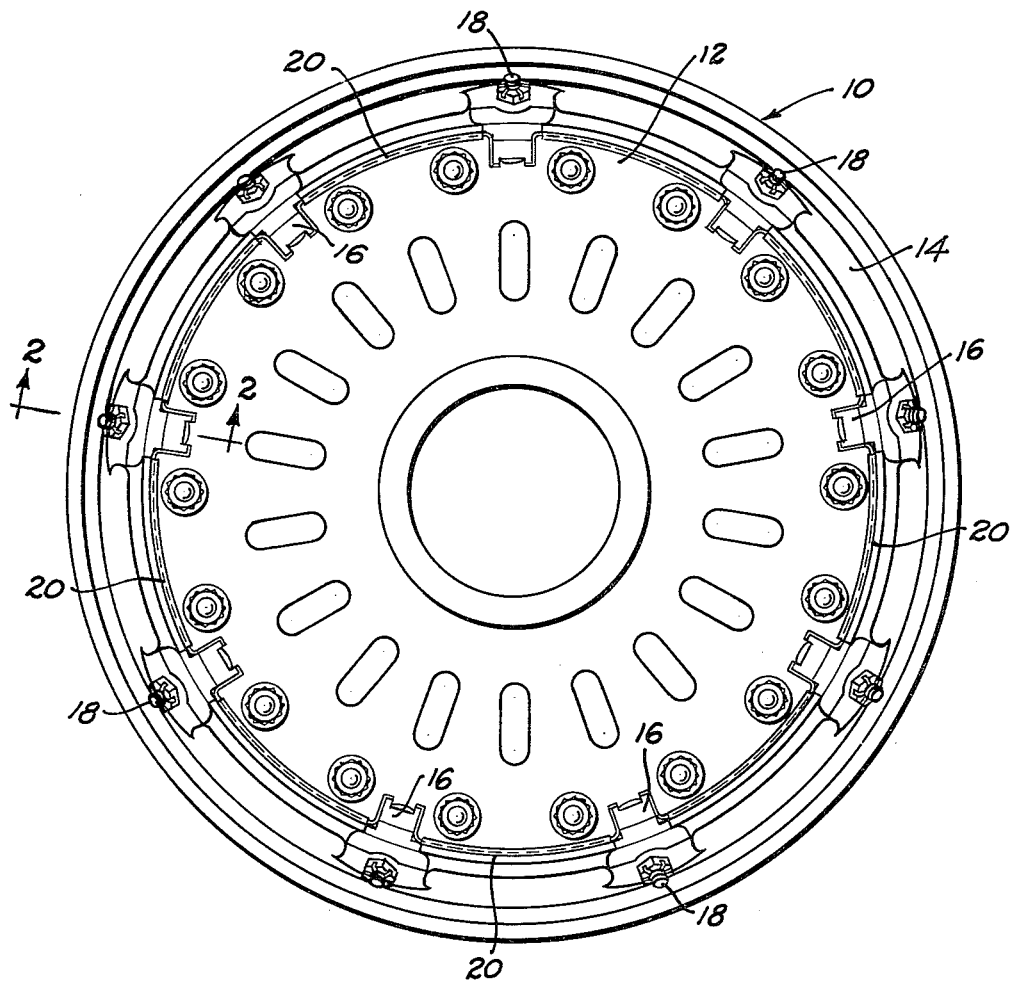
FIG_1
INVENTOR.
RAYMOND R. ROGERS.
BY
*William S. Thompson*
AGENT

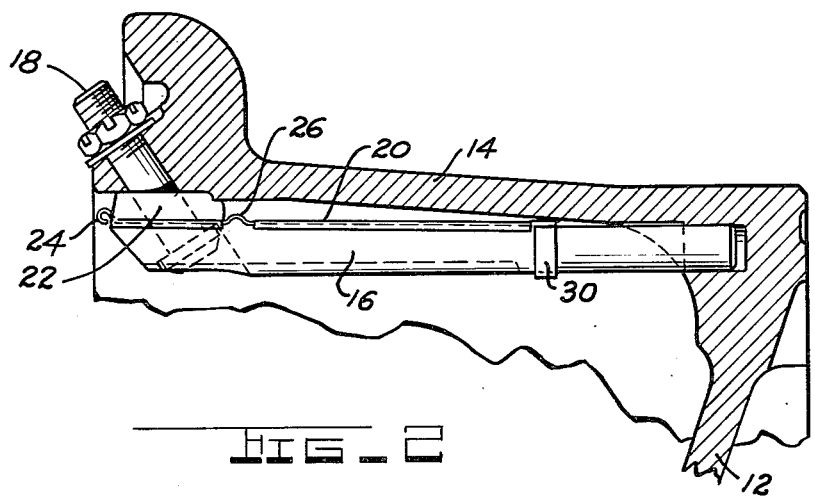
FIG_2
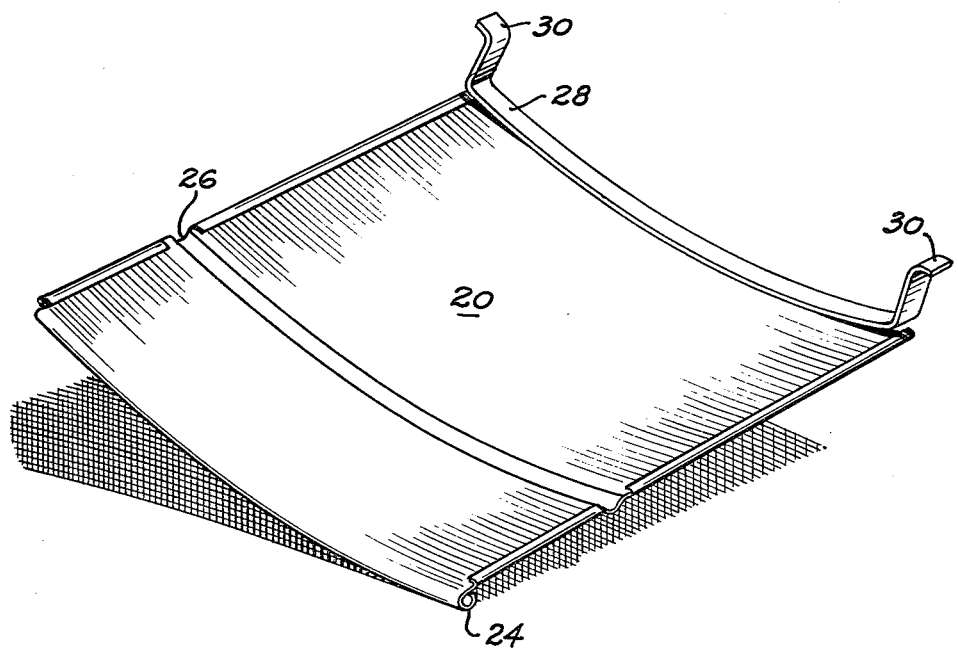
FIG_3
INVENTOR.
RAYMOND R. ROGERS.
BY
William S Thompson
AGENT.

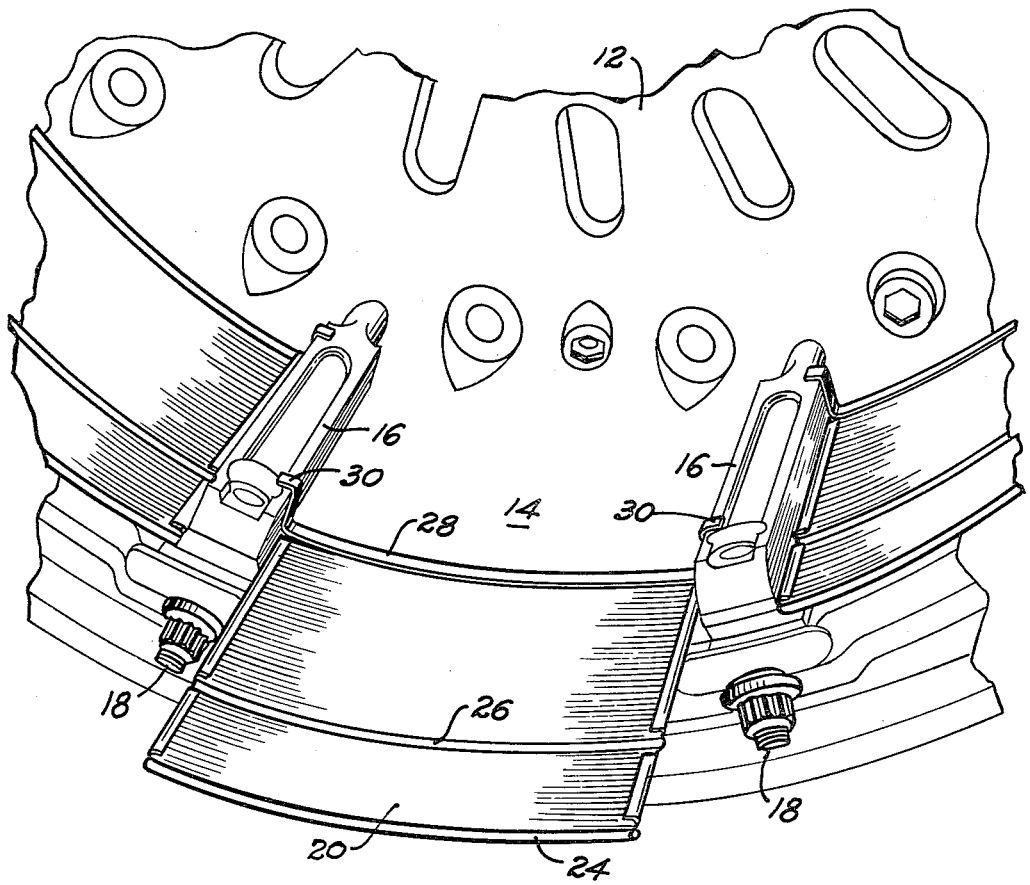
FIG_4

3,051,528
SEGMENTED HEAT SHIELD FOR WHEELS
Raymond R. Rogers, Paw Paw, Ill., assignor to The Bendix Corporation, South Bend, Ind., a corporation of Delaware
Filed Aug. 15, 1960, Ser. No. 49,567
4 Claims. (Cl. 301—6)

The present invention relates to an improvement in wheels and more particularly to a segmented heat shield therefor for protecting wheel and tire structure from adverse effects due to heat generated by an associated high energy absorbing brake.

It has been found in wheel and brake combinations, particularly those used on aircraft having a high energy dissipation requirement, that the heat generated by the brake device induces highly deteriorative effects on the wheel and tire structure. This deterioration has been evidenced on occasions by extreme rupture of the tire member causing a personal and property hazard and also results in shorter service life for the wheel and tire structure. The quantity of heat that permeates the wheel and tire structure is dependent not only on the design and size of the vehicle, wheel and brake parts but also on the particular use undertaken. For example, aircraft used to train pilots in landing or braking procedures may have to withstand many repeated brake applications in a short period of time compared to aircraft used in normal service. Except for emergency conditions, one of the most extreme conditions of brake heat generation is encountered in practice rejected-take-offs which may be repeatedly experienced in training aircraft and rarely experienced in normal service aircraft. Such use occasions high temperature conditions that cannot always be predicted by the designer or even if predicted would result in seriously overdesigning the majority of aircraft wheels with consequent weight and cost penalties. Consequently, it is an object of the present invention to provide a segmented heat reflective shield that may be readily installed in existing in-service aircraft wheels wherein the use of the aircraft requires additional heat protection.

It is an additional object of the present invention to provide a heat shield for wheels that may be readily inserted and removed to facilitate wheel inspection without necessitating the disassembly of any wheel components.

Additional objects and advantages of the present invention will become apparent on consideration of the description and drawings, wherein:

FIGURE 1 is a side view of a wheel having segmented heat shields in accordance with the present invention;

FIGURE 2 is a cross sectional view of a portion of the wheel of FIGURE 1 taken along section 2—2 illustrating a brake drive key and side view of a segmented heat shield;

FIGURE 3 is an isometric projection of one segmented heat shield in its preferred form in accordance with the present invention; and FIGURE 4 is an isometric view of my heat shield segment and a portion of the wheel in a condition of partial assembly.

Referring to FIGURE 1, there is shown a side view of a wheel 10 having a central supporting web 12. A rim 14, end view visible in FIGURE 1, is supported by web 12 and extends outwardly therefrom to form a brake receiving cavity within the wheel. A series of brake drive keys 16 are spaced along the inner surface of rim 14 and secured in position by bolts 18. It is the primary purpose of the drive keys to drive the rotative segments of a brake of the disc type, not shown, housed within the interior wheel cavity. A series of segmented heat shields 20 in accordance with the principles of the present invention are interfitted between adjacent drive keys along the inner surface of rim 14 to deflect and reflect convective and radiant heat emanating from the brake structure and materially reduce the heat penetration into and through rim 14. It has been found, for example, in certain installations that peak temperatures at the rim may be reduced by as much as 100° F. by the installation of shields as disclosed.

In FIGURE 2 is a sectional view taken along section 2—2 of FIGURE 1 illustrating more clearly a portion of the brake receiving cavity defined by rim 14 and web 12 and a side view of drive key 16 and heat shield 20. Drive key 16 includes an enlarged base plate 22 formed thereon which supports one edge of heat shield 20 and thus prevents any movement of said heat shield in a wheel radial direction towards rim 14 and thereby insuring the existence of an insulating air space between said rim and said shield members. Heat shield 20 includes a rolled edge 24 having the duo purpose of avoiding sharp edges and also for abutting drive key 16 to prevent further movement in a wheel axial direction towards web 12 from that illustrated in FIGURE 2. Groove 26 formed in shield 20 provides a locking catch preventing axial movement away from web 12.

FIGURE 3 illustrates a segmented heat shield in isometric form. This figure best illustrates the arcuate form of the shield and the associated spring member or clip 28 having projections 30 which engage adjacent drive keys and increase the resistance to shield movement as well as guide it in an axial direction with respect to wheel 10, such that the shield may be securely locked in position.

Turning to FIGURE 4 segmented heat shield 20 is shown partially inserted into position. It will be noted from this figure that the drive keys 16 have relatively flat sides extending substantially normal from the inner curved surface of rim 14 and thus operate to restrain shield 20 from moving inwardly in a radial direction by virtue of a wedging or keystone effect.

Thus the heat shield is restrained in three directions of movement, with respect to wheel axial, radial and circumferential directions, so as to remain securely locked into position during normal operation; yet, it may be readily removed and reinserted when desired by withdrawing the shield against the force provided by spring means 30. In event it is desired to equip an existing-in-service wheel with a heat plate of the present invention it is only necessary to obtain the necessary dimensions between adjacent drive keys, fabricate the plates which then may be installed in the field without requiring wheel disassembly.

Having thus described my invention, what I claim as new therein is:

1. A wheel comprising a tire supporting rim defining the outer periphery of a brake receiving cavity, a plurality of brake drive keys spaced circumferentially along the inner surface of said rim, a heat reflective shield member removably secured at opposite sides to adjacent drive key members.

2. A wheel comprising a tire supporting rim defining the outer periphery of a brake receiving cavity, a plurality of brake drive keys spaced circumferentially along the inner surface of said rim, a heat reflective shield member removably inserted between adjacent drive keys, said drive keys having substantially flat sides normal to said rim operative to lock said shield member in position and restrain movement thereof inwardly in a wheel radial direction.

3. A wheel as claimed in claim 2 wherein said shield member includes a spring member formed along one edge and engaging adjacent drive keys to increase the resistance to movement of said shield member in a wheel axial direction.

4. A wheel as claimed in claim 2 wherein said drive keys are formed with an enlarged base plate which provides an abutment for said shield member restraining movement thereof outwardly in a wheel radial direction and operative to insure an air space between said rim and said shield member.

References Cited in the file of this patent

UNITED STATES PATENTS

| | | |
|---|---|---|
| 445,259 | Curtis et al. | Jan. 27, 1891 |
| 2,017,715 | Goodyear et al. | Oct. 15, 1935 |
| 2,242,048 | Ash | May 13, 1941 |
| 2,298,333 | Ash et al. | Oct. 13, 1942 |
| 2,875,855 | Albright | Mar. 3, 1959 |

FOREIGN PATENTS

| | | |
|---|---|---|
| 280,920 | Great Britain | June 14, 1928 |
| 469,803 | Great Britain | July 27, 1937 |